2 Sheets—Sheet 1.

C. PHILLIPS.

PEDAL MOTOR.

No. 11,331.

Reissued May 9, 1893.

Witnesses;
H. E. Bates.
M. W. McRoden.

Inventor;
Charles Phillips
By Howard L. Osgood
Atty.

THE NORRIS PETERS CO., PHOTO-LITHO., WASHINGTON, D. C.

2 Sheets—Sheet 2.

C. PHILLIPS.

PEDAL MOTOR.

No. 11,331.

Reissued May 9, 1893.

Witnesses;
H. N. Bates
M. W. McRoden.

Inventor,
Charles Phillips
By
Howard L. Osgood
Atty.

THE NORRIS PETERS CO., PHOTO-LITHO., WASHINGTON, D. C.

UNITED STATES PATENT OFFICE.

CHARLES PHILLIPS, OF ROCHESTER, NEW YORK, ASSIGNOR OF ONE-HALF TO HENRY S. DURAND, OF SAME PLACE.

PEDAL-MOTOR.

SPECIFICATION forming part of Reissued Letters Patent No. 11,331, dated May 9, 1893.

Original No. 457,290, dated August 4, 1891. Application for reissue filed February 16, 1893. Serial No. 462,638.

*To all whom it may concern:*

Be it known that I, CHARLES PHILLIPS, of Rochester, New York, formerly of Chicago, Illinois, have invented certain new and useful Improvements in Pedal-Motors, of which the following is a specification.

My invention relates more particularly to pedal-motors for bicycles and other purposes; and it consists in combining certain levers and bars with a pair of cranks, whereby I overcome the dead-points and secure an increase of power.

In the accompanying drawings I have shown my invention applied to a safety bicycle.

Figure 1:
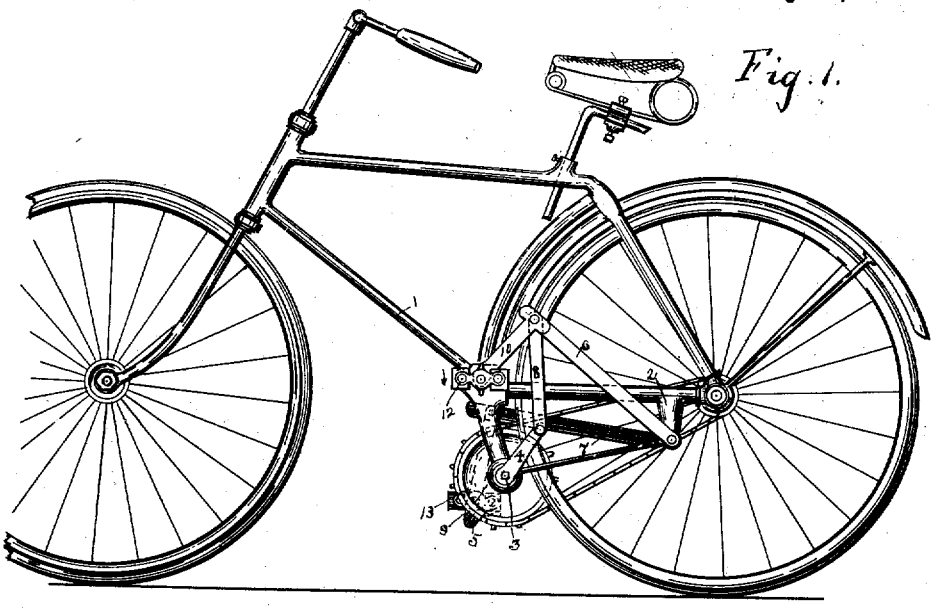
Figure 2:
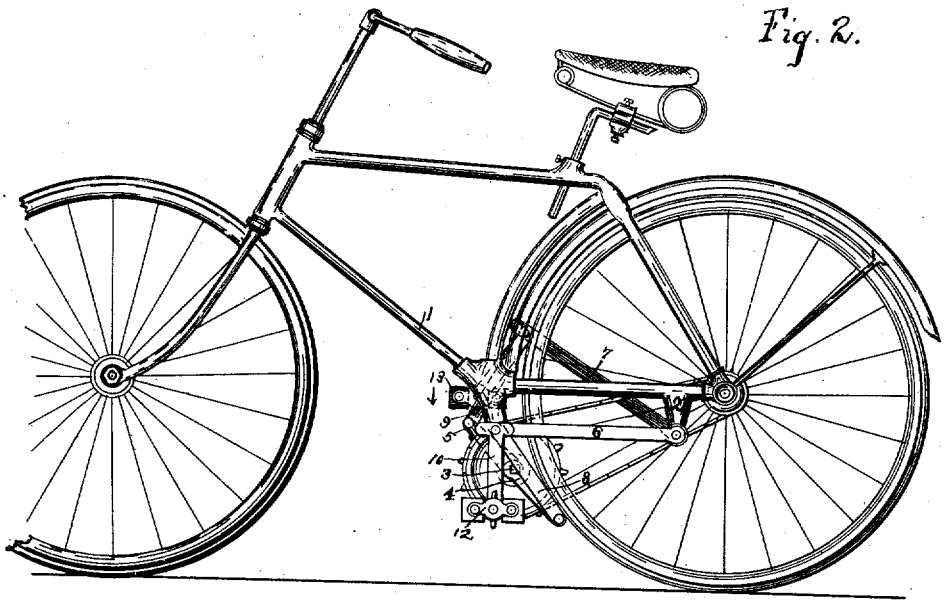
Figure 3:
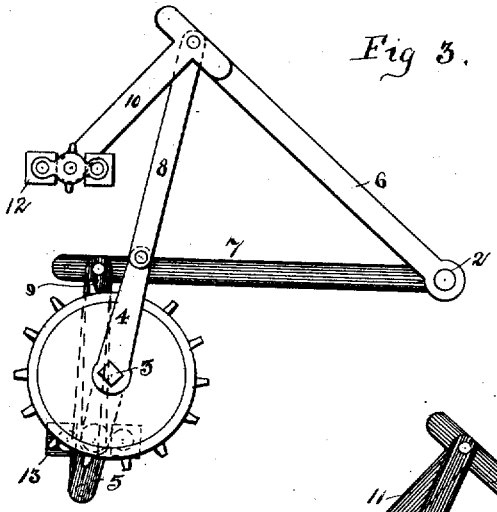
Figure 4:
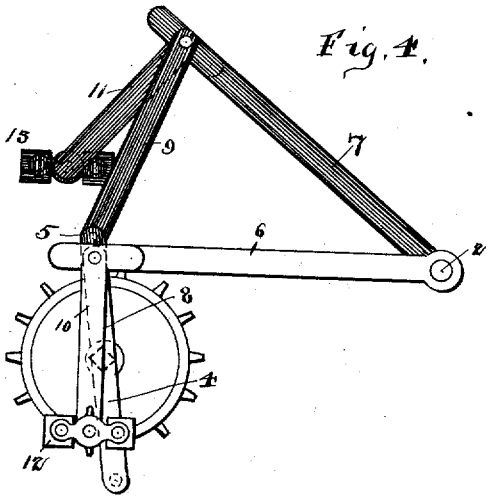
Figure 5:
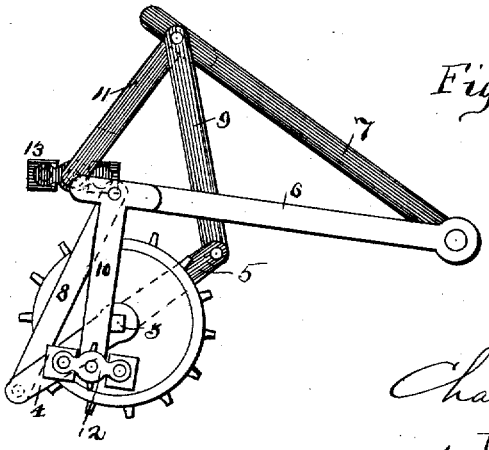

Figure 1 is an elevation from the left side of a bicycle, showing the right-hand crank just completing a downstroke. Fig. 2 is a similar view, but with the right-hand crank just started on its downstroke. Figs. 3, 4 and 5 are diagrams showing different positions of the cranks and connections.

1 is the usual frame of the bicycle.

2 are hangers on the rear wheel-fork.

3 is the crank-shaft, mounted in the usual manner and connected with the wheel by sprocket-pinions and chain, as shown.

4 and 5 are the cranks, set, as usual, diametrically opposed on the shaft.

6 and 7 are radius bars or beams pivoted at their ends to the hangers 2 and connected at their front ends by links 8 and 9 to the cranks 4 and 5, respectively.

10 and 11 are depending arms integral with or rigidly connected to the front ends of beams 6 and 7.

12 and 13 are the treadles, adjustably secured in the usual manner to the arms 10 and 11.

For convenience I have used the even numbers 4, 6, 8, 10 and 12 to designate the members on the left-hand side of the machine and the corresponding odd numbers for those on the right. In practice I have found it best to use the following proportions, viz: I fix the pivotal point 2 at a distance above the level of the crank-shaft equal to three-fourths of the length of the crank-arm. I then make the beams equal in length to the distance from the center of the crank-shaft to the center of the pivotal point 2 and the links 8 and 9 equal to the same distance less the length of the crank-arm. The arms 10 and 11 may be of a length to suit the legs of the rider of the machine.

The manner in which I overcome the dead-points and gain power is illustrated in Figs. 3 and 4. Fig. 3 shows that when one of the cranks, as 4, is on its upper dead-point the other crank has not yet reached its lower dead-point, and Fig. 4 shows that when one of the cranks, as 4, is on its lower dead-point the other one has passed its upper dead-point. In other words, the two cranks are never both on their dead-points at the same time, and there is thus always a margin of power available to drive them over their respective dead-points. The motion of the treadles 12 and 13 being in a small arc of the circle, whose center is at the pivot 2, is substantially a vertical motion even at its upper and lower limits. Hence the weight of the rider and the direct push of his leg is available through the entire stroke to a greater degree than where the treadle moves more or less horizontally, as it does when attached directly to a crank-arm.

It is obvious that the beams, links and cranks proportioned and arranged as above set forth, will cause the point of connection between each link and its corresponding beam to describe an arc, the greater part of which is behind (that is, on the side of the pivotal point 2) a straight line drawn through the center of the crank-shaft 3 and at right angles to a line drawn through the pivotal point 2 and the connecting point between the link and said beam, when the beam is at the limit of its downward motion. If this relation of said arc to said line is changed, there will be either a loss of power or too rapid a motion of the beam on its return stroke.

It will be observed that on the down stroke of the pedal during the first quarter of the crank's revolution, that is in passing from the vertical to the horizontal position, the connecting point between the link and beam moves through a much longer arc than during the second quarter of the crank's revolution. Hence the motion of the foot during the first quarter is faster than during the second quarter, and the power exerted is proportionately greater. At the same time, the velocity and motion of the pedal gradually diminishes during the second quarter until at the extreme of the down stroke there is an appreciable period of practical rest, thus enabling the muscles to recover preparatory to the up-stroke. When the pedal is in its elevated position at the beginning of the down stroke there is no such pause, the change in the direction of motion being instantly effected.

The effective power exerted upon the crank is applied and distributed to the greatest advantage by the arrangement of parts described, in that at the beginning of the down stroke the pedal occupies a position in advance of the crank pin, and power is transmitted to the latter through the link from a point in rear of the pedal. As the crank pin advances the angle between the link and beam is increased, and a toggle action is developed, which latter increases in power until the crank pin reaches its most forward position and stands in substantially a horizontal plane; from this point the link gradually approaches the pedal, and a perpendicular thrust is developed upon the crank pin, the power diminishing as the crank arm and link come into line; but before this occurs the opposite pedal has reached a point where it exerts effective power. Not only is the effective power increased by this means, but the path traversed by the foot is shortened, being appreciably less than if the pedal were applied directly to the crank.

I have shown my invention as applied to a bicycle; but it is equally applicable to other machines driven by cranks.

I claim—

1. The combination, substantially as set forth, with the frame and wheels of a safety bicycle, of a crank-shaft journaled to said frame and connected to the driving-wheel by suitable transmitting mechanism, two cranks oppositely attached to said shaft, beams, as 6 and 7, fulcrumed above the level of said shaft to the frame behind the shaft and extending forward over the shaft, links connecting the cranks with the free ends of the beams, and pedals connected to the free ends of the beams for operating the same.

2. The combination, with the frame and wheels of a safety bicycle, of a crank-shaft journaled to said frame and connected to the driving wheel by suitable transmitting mechanism, two cranks oppositely attached to said shaft, beams, as 6 and 7, fulcrumed above the level of said shaft, to the frame behind the shaft and extending forward over the shaft, links connecting the cranks with the free ends of the beams, and pedals connected to the free ends of the beams for operating the same, said beams, cranks and links proportioned and arranged substantially as set forth, whereby the connecting points between the beams and links describe arcs, the greater portion of each of which lies behind a line drawn through the center of the crank-shaft and at right angles to a line drawn through the pivotal and connecting points of the beam when the latter is at the limit of its downward motion.

3. The combination, substantially as set forth, of a crank-shaft, opposite crank-arm thereon, beams pivoted to the frame, links connecting said crank-arms to the free ends of the beams, each of said beams being equal in length to the combined lengths of its crank-arm and link and pivoted to the frame behind and above the crank-shaft and at a distance therefrom equal to the said combined lengths, and pedals connected to the free ends of the beams, substantially as described.

CHARLES PHILLIPS.

Witnesses:
M. H. McMATH,
A. W. RUSSELL.